Oct. 31, 1967  A. STRASHEIM  3,350,567
PHOTOELECTRIC ATTACHMENT FOR SPECTROMETRIC
OR SPECTROGRAPHIC APPARATUS
Filed July 22, 1964
2 Sheets-Sheet 1
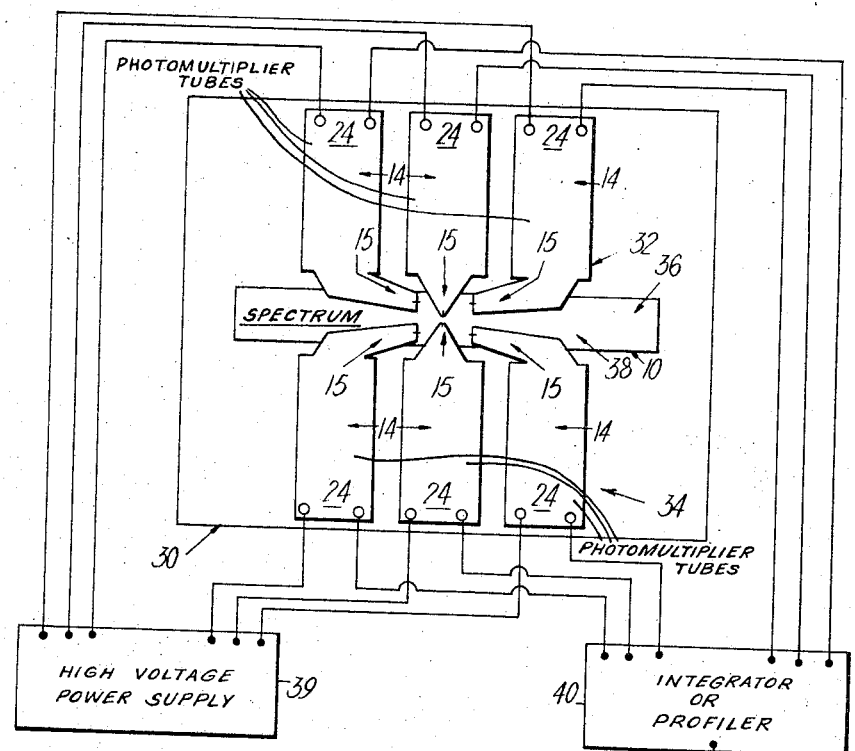
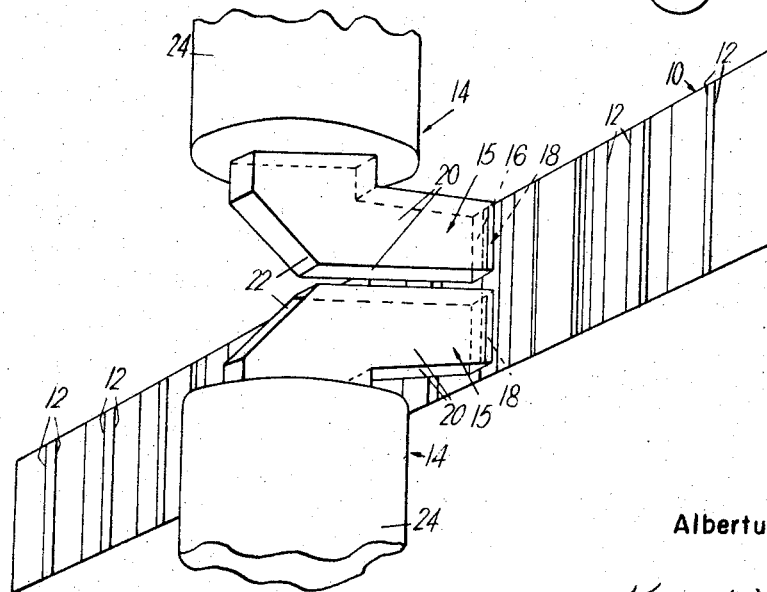
Inventor
Albertus Strasheim
By Karl W. Flocks
Attorney

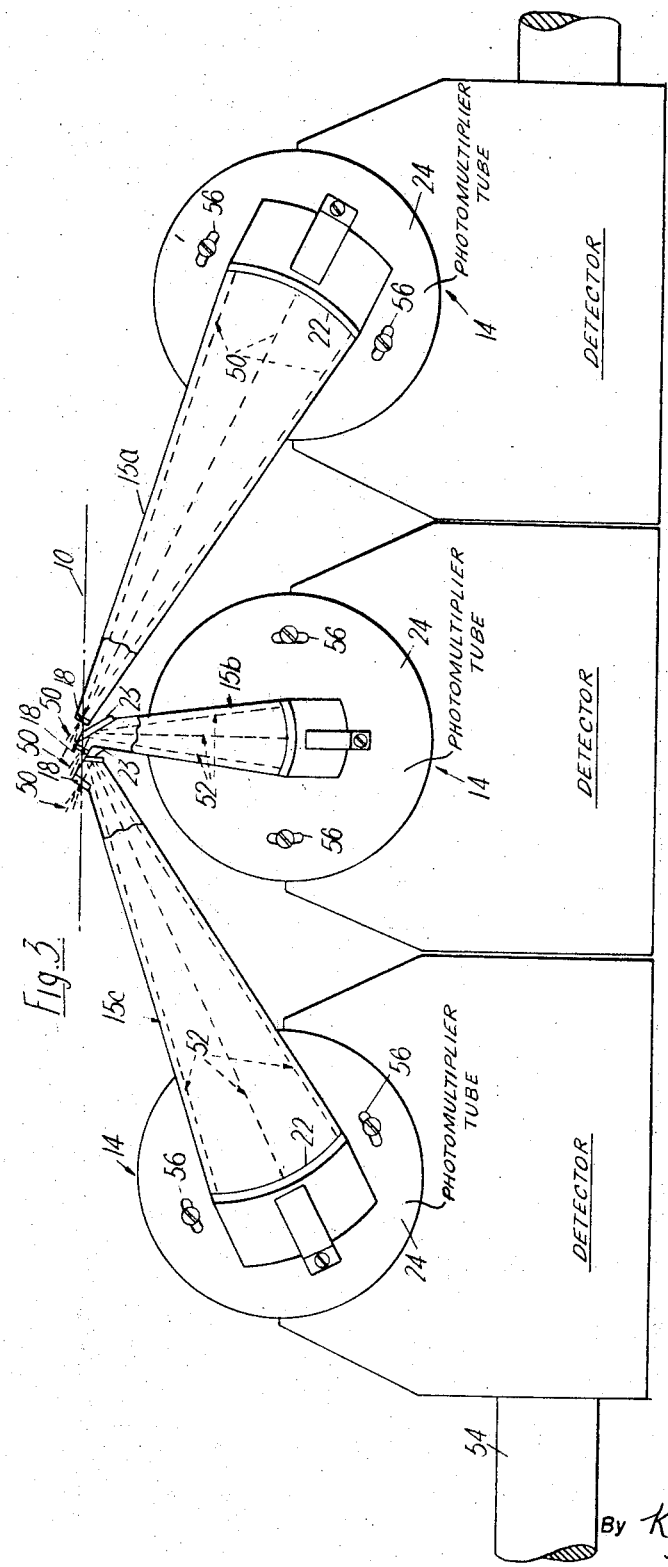

United States Patent Office 3,350,567
Patented Oct. 31, 1967

3,350,567
PHOTOELECTRIC ATTACHMENT FOR SPECTROMETRIC OR SPECTROGRAPHIC APPARATUS
Albertus Strasheim, Pretoria, Transvaal, Republic of South Africa, assignor to South African Inventions Development Corporation, Pretoria, Transvaal, Republic of South Africa
Filed July 22, 1964, Ser. No. 384,485
Claims priority, application Great Britain, July 23, 1963, 29,192/63
4 Claims. (Cl. 250—226)

ABSTRACT OF THE DISCLOSURE

Spectrometric apparatus which includes a plurality of detectors spaced transversely relatively to each other across the width of the spectrum, and such that independent observations can be made along the length of a single spectral line by means of the said detectors.

---

This invention relates to spectrometric or spectrographic apparatus used in spectral analysis.

In order that effective measurement of the light intensity of a spectral line for a given element may be made, it is necessary that the spectral line be measured in isolation from the rest of the spectrum. This is done by positioning a detector having a slit, such that the slit is in register with the spectral line whose intensity is to be measured and in the focal plane of the spectrum, the slit being wide enough to allow only light from that line to pass through. The light intensity passing through the slit may be measured by means of a photosensitive device, for example photomultiplier tube. In carrying out tests it is sometimes necessary to obtain readings for lines which are close together.

Apparatus previously used employed slits and photosensitive devices for measuring the intensity of a spectral line, the slits having semi-permanent settings over given spectral lines. These settings could be changed only with difficulty, to measure other lines. Another apparatus employed a readily movable photosensitive device and slits. In both sets of apparatus, however, the physical dimensions of the parts in which the slits are provided, prevent the simultaneous measurement of two closely adjacent spectral lines. Yet another apparatus employed means for moving the spectrum across a slit, together with an associated measuring device. This apparatus has the disadvantage that the necessary shift of the spectrum across the slit occupies a finite time and the measurements of adjacent lines are then separated by such finite time.

It is an object of this invention to provide means for measuring two closely adjacent spectral lines, or even to conduct independent measurements on the same spectral line.

According to the invention, spectrometric apparatus includes at least two detectors spaced transversely relatively to each other across the width of the spectrum.

The apparatus may include displacing means for displacing the detectors longitudinally along the length of the spectrum, thereby permitting both detectors to be positioned such that their slits are simultaneously in register with a pair of closely spaced spectral lines, or in register with the same spectral line if desired. The displacing means may be such that a detector can be positioned semi-permanently.

When the spectrum is spread horizontally, the detectors are arranged as an upper and a lower detector.

Guide means may be provided whereby each detector may be displaced across the full length of the spectrum independently of the other.

A detector may comprise a photomultiplier tube for measuring the intensity of the light, the light energy being then converted into electrical energy which may be measured directly, or which may be integrated and measured by known electronic techniques. A detector comprising a photomultiplier tube may further comprise walls extending away from the slit and defining a passage or duct and a mirror or mirrors disposed transversely to the passage to reflect light entering the passage through the slit, into the photomultiplier tube.

If desired, a plurality of detectors may be arranged adjacent to another. In order to secure close positioning of the slits of adjacent detectors, their ducts may be arranged to have their axes converging, mirrors being provided where necessary closely behind the slits at suitable inclinations to reflect the incident light rays entering the slits, along the ducts into their associated photomultiplier tubes.

The invention will now be described with reference to the accompanying drawings in which:

FIGURE 1 shows diagrammatically a pair of opposing detectors in relation to a spectrum;

FIGURE 2 shows a block diagram of appartus including a head having a set of detectors arranged in series and opposed to another set; and FIGURE 3 shows a plan view of a bank of detectors arranged adjacent one another in series.

Referring to FIGURE 1 of the drawings, reference numeral 10 refers generally to a spectrum, the various lines 12 corresponding to the various elements. A detector indicated generally by reference numeral 14 comprises a passage or duct 15 defined by a front wall 16 having a slit 18, and walls 20 defining the passage across which is provided a mirror 22 (or mirrors 22 and 23), disposed at a suitable inclination to reflect light to the photomultiplier tube 24.

The two detectors shown are positionable independently of each other on closely spaced spectral lines and even on the same spectral line if desired.

In FIGURE 2 is shown a head 30 comprising two sets of detectors arranged in series and displaceable independently of one another. The one set 32 serves the upper half 36 of the spectrum and the other set 34 serves the lower half 38.

A high voltage power supply 39 serves to energize the photomultiplier tubes 24 of the detectors 14. The outputs of the several tubes 24 are connected to an integrator or profiler 40 which in turn has a direct reading meter 42 operatively connected to it, whereby the light intensity of the spectral lines may be measured.

Referring to FIGURE 3 of the drawings, three detectors are shown, arranged in series, the detectors having ducts 15 whose axes converge towards the focal plane 10 of the spectrum. It will be noted that duct 15a is in line with the rays 50 of incident light, whereas ducts 15b and 15c are provided with mirrors 23 closely spaced behind the respective slits 18 to reflect the light along the ducts 15b and 15c. The rays 50 fall directly on mirror 22 of the detector having duct 15a, and the reflected rays 52 passing along ducts 15b and 15c fall on the mirrors 22 of those ducts. The mirrors 22 reflect their incident rays to their associated photomultiplier tubes 24.

The slits 18 are disposed in the focal plane of the spectrum 10. The convergent arrangement of the ducts makes it possible for the slits of the different detectors to be closely positionable relative to one another. The detectors 14 are supported by bar 54 and are positionable axially along it.

The detectors 14 are adjustable in position about their principal axes by means of arcuate slots 56.

This arrangement makes it possible for a plurality of detectors to be positioned to measure a number of spectral lines.

As will be noted from FIGURE 3 of the drawings, the mirror 22 of a detector is of concave shape.

I claim:
1. An attachment which includes
   (a) at least two spectrometric photodetectors, each having a slit,
   (b) means for attaching it to spectrometric apparatus such that the slits of the detectors are in the spectral focal plane of the said apparatus,
   (c) the detectors
      (i) having each a mounting permitting its displacement in a direction perpendicular to the longitudinal dimension of the spectral lines and in the focal plane, such that its slit is alignable with different spectral lines in the said focal plane, and
      (ii) having their slits spaced relatively to each other in a direction parallel to the dimension of the spectral lines, such that the slits are alignable simultaneously with closely spaced spectral lines and even with a single spectral line, and such that independent observations can be made of a single spectral line by means of the said detectors.

2. An attachment which includes
   (a) a plurality of spectrometric photodetectors each having a slit;
   (b) means for attaching it to spectrometric apparatus such that the slits of the detectors are in the spectral focal plane of the said apparatus;
   (c) the detectors
      (i) having each a mounting permitting its displacement in a direction perpendicular to the longitudinal dimension of the spectral lines and in the focal plane such that its slit is alignable with different spectral lines in the said focal plane,
      (ii) having their slits spaced relatively to each other in a direction parallel to the dimension of the spectral lines such that the slits are alignable simultaneously with closely spaced spectral lines and even with a single spectral line, and such that independent observations can be made of a single spectral line by means of the said detectors,
      (iii) being arranged in at least two banks spaced along the dimension of a spectral line, a plurality of detectors being provided in each bank,
      (iv) having each a duct in which its slit is provided at one end of the duct,
      (v) in a bank having their ducts converging toward the said focal plane, at least some of the ducts having mirrors behind the slits to reflect along the ducts, incident light entering their slits.

3. An attachment which includes
   (a) a plurality of spectrometric photodetectors each having a slit,
   (b) means for attaching it to spectrometric apparatus such that the slits of the detectors are in the spectral focal plane of the said apparatus,
   (c) the detectors
      (i) having each a mounting permitting its displacement in a direction perpendicular to the longitudinal dimension of the spectral lines and in the focal plane such that its slit is alignable with different spectral lines in the said focal plane,
      (ii) having their slits spaced relatively to each other in a direction parallel to the dimension of the spectral lines such that the slits are alignable simultaneously with closely spaced spectral lines and even with a single spectral line, and such that independent observations can be made of a single spectral line by means of the said detectors,
      (iii) being arranged in at least two banks, spaced along the dimension of a spectral line, a plurality of detectors being provided in each bank,
      (iv) having each a duct in which its slit is provided at one end,
      (v) in a bank having their ducts converging toward the said focal plane, at least some of the ducts having mirrors behind their slits to reflect along the ducts, incident light entering their slits, the ducts being adjustable relative to the detector mountings so as to provide adjustability in their inclination to the focal plane.

4. Spectrometric apparatus incorporating as integral parts at least two spectrometric photodetectors each having a slit and mounted such that the slits of the detectors are in the spectral focal plane of the said apparatus; the detectors having each a mounting permitting its displacement in a direction perpendicular to the longitudinal dimension of the spectral lines and in the focal plane, such that its slit is alignable with different spectral lines in the said focal plane, and having their slits spaced relatively to each other in a direction parallel to the dimension of the spectral lines such that the slits are alignable simultaneously with closely spaced spectral lines and even with a single spectral line, and such that independent observations can be made of a single spectral line by means of the said detectors.

References Cited

UNITED STATES PATENTS

| | | | |
|---|---|---|---|
| 2,279,646 | 4/1942 | Smith | 250—226 X |
| 2,446,874 | 8/1948 | Geffner et al. | 88—14 |
| 2,946,253 | 7/1960 | Clark | 250—227 X |
| 2,975,669 | 3/1961 | Jarrell et al. | 88—145 |

RALPH G. NILSON, *Primary Examiner.*

J. D. WALL, *Assistant Examiner.*